(12) United States Patent
Saito et al.

(10) Patent No.: US 12,450,018 B2
(45) Date of Patent: Oct. 21, 2025

(54) RECORDING MEDIUM, CONTROL METHOD AND INFORMATION PROCESSING APPARATUS HAVING PRINT SETTING THAT SELECTIVELY REQUIRES A PASSWORD

(71) Applicant: CANON KABUSHIKI KAISHA, Tokyo (JP)

(72) Inventors: Kazuyuki Saito, Kanagawa (JP); Shinya Suzuki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/637,567

(22) Filed: Apr. 17, 2024

(65) Prior Publication Data

US 2024/0264784 A1 Aug. 8, 2024

Related U.S. Application Data

(63) Continuation of application No. 17/571,869, filed on Jan. 10, 2022, now Pat. No. 12,014,097, which is a
(Continued)

(30) Foreign Application Priority Data

May 7, 2018 (JP) .................................. 2018-089181

(51) Int. Cl.
*G06F 3/12* (2006.01)
(52) U.S. Cl.
CPC .......... *G06F 3/1253* (2013.01); *G06F 3/1207* (2013.01); *G06F 3/1222* (2013.01); *G06F 3/1238* (2013.01); *G06F 3/1276* (2013.01)

(58) Field of Classification Search
None
See application file for complete search history.

(56) References Cited

U.S. PATENT DOCUMENTS 8,988,715 B2 3/2015 Tarumi
9,164,714 B2 10/2015 Kikuchi
(Continued)

FOREIGN PATENT DOCUMENTS

CN 102609226 A 7/2012
CN 102880435 A 1/2013
(Continued)

OTHER PUBLICATIONS

Office Action issued in U.S. Appl. No. 16/382,445 mailed Aug. 25, 2020.
(Continued)

*Primary Examiner* — Dov Popovici
(74) *Attorney, Agent, or Firm* — ROSSI, KIMMS & McDOWELL LLP

(57) ABSTRACT

A non-transitory recording medium storing a computer program for an application providing a Graphical User Interface (GUI) causing a computer to perform each step of a control method of the computer, the method including: a reception step of receiving a print ticket including a print setting according to activation of the program for the application by an operating system after a print instruction is given by a user; and a display control step of displaying a screen for authenticated printing based on the received print ticket in which the authenticated printing has been set.

21 Claims, 20 Drawing Sheets

Related U.S. Application Data continuation of application No. 16/382,445, filed on Apr. 12, 2019, now Pat. No. 11,275,542.

(56) References Cited

U.S. PATENT DOCUMENTS

| | | | |
|---|---|---|---|
| 9,830,544 | B2 | 11/2017 | Mitsui |
| 11,275,542 | B2 | 3/2022 | Saito et al. |
| 2012/0013926 | A1 | 1/2012 | Sugai |
| 2012/0120431 | A1 | 5/2012 | Kino |
| 2015/0301773 | A1 | 10/2015 | Minagawa |
| 2016/0162235 | A1* | 6/2016 | Saigusa ............... G06F 3/1205 358/1.15 |
| 2016/0212297 | A1 | 7/2016 | Nagasawa |
| 2017/0168669 | A1* | 6/2017 | Ohira ............... H04N 1/00411 |
| 2019/0050183 | A1 | 2/2019 | Inoue |

FOREIGN PATENT DOCUMENTS

| | | |
|---|---|---|
| CN | 103176757 A | 6/2013 |
| CN | 106484339 A | 3/2017 |
| JP | 2007272713 A | 10/2007 |
| JP | 2008217433 A | 9/2008 |
| JP | 2011186969 A | 9/2011 |
| JP | 2012108591 A | 6/2012 |
| JP | 2013145494 A | 7/2013 |
| JP | 2013152608 A | 8/2013 |
| JP | 2015001829 A | 1/2015 |
| JP | 2015018474 A | 1/2015 |
| JP | 2015166918 A | 9/2015 |
| JP | 2016057878 A | 4/2016 |
| JP | 2016110612 A | 6/2016 |
| JP | 2016122365 A | 7/2016 |
| JP | 2017054222 A | 3/2017 |
| JP | 2018028817 A | 2/2018 |
| JP | 2018049580 A | 3/2018 |
| JP | 2018049597 A | 3/2018 |

OTHER PUBLICATIONS

Office Action issued in U.S. Appl. No. 16/382,445 mailed Jan. 29, 2021.

Office Action issued in U.S. Appl. No. 16/382,445 mailed Jun. 30, 2021.

Notice of Allowance issued in U.S. Appl. No. 16/382,445 mailed Dec. 9, 2021.

Office Action issued in Chinese Appln. No. 201910376155.8 mailed on Jan. 28, 2023. English translation provided.

Office Action issued in U.S. Appl. No. 17/571,869 mailed May 10, 2023.

Office Action issued in U.S. Appl. No. 17/571,869 mailed Oct. 19, 2023.

Notice of Allowance issued in U.S. Appl. No. 17/571,869 mailed Feb. 13, 2024.

\* cited by examiner

FIG. 4A

```
<?xml version="1.0" encoding="utf-8"?>
<PackageInfo xmlns="http://schemeas.microsoft.com/windows/DeviceMetadata/PackageInfo/2007/11/">
    <MetadataKey>
        <HardwareIDList> ——— 402
            <HardwareID>DOID:MFP1_abcd</HardwareID> ——— 403
            <HardwareID>DOID:MFP2_ijkl</HardwareID> ——— 404
        </HardwareIDList>
    </MetadataKey>
</PackageInfo>
```

FIG. 4B

```
<?xml version="1.0" encoding="utf-8"?>
<SoftwareInfo xmlns="http://schemeas.microsoft.com/windows/DeviceMetadata/SowftwareInfo/2007/11/">
    <DeviceCompanionApplication> ——— 411
        <Package>
            <Identity Name="1234abcd.MFPUtility" Publisher="CN=12345678-abcd-efgh-ijkl-123456189012" /> ——— 412
            <Applications>
            </Applications>
        </Package>
    </DeviceCompanionApplications>
</SoftwareInfo>
```

FIG. 11

```
<?xml version="1.0" encoding="UTF-8"?>
<psf:PrintCapabilities>
  <psf:Feature name="ns0000:JobSecurePrint">
    <psf:Property name="psf:SelectionType">
      <psf:Value xsi:type="xsd:QName">psk:PickOne</psf:Value>
    </psf:Property>
    <psf:Property name="psk:DisplayName">
      <psf:Value xsi:type="xsd:string">Secure print</psf:Value>
    </psf:Property>
    <psf:Option name="ns0000:None" constrained="psk:None">
      <psf:Property name="psk:DisplayName">
        <psf:Value xsi:type="xsd:string">Off</psf:Value>
      </psf:Property>
    </psf:Option>
    <psf:Option name="ns0000:SecurePrint" constrained="psk:None">
      <psf:Property name="psk:DisplayName">
        <psf:Value xsi:type="xsd:string">On</psf:Value>
      </psf:Property>
    </psf:Option>
  </psf:Feature>
```

```
<psf:PrintTicket xmlns:psf="http://2003/08/printing/printschemaframework"
xmlns:xsi="http://www.w3.org/2001/XMLSchema-instance"
xmlns:xsd="http://www.w3.org/2001/XMLSchema"
version="1"
xmlns:ns0000="http://www.canon.com/ns/printschema/oip/v200"
xmlns:psk="http://schemas.microsoft.com/windows/2003/08/printing/printschemakeywords"
xmlns:pskv11="http://schemas.microsoft.com/windows/2013/05/printing/printschemakeywordsv11">
    ...
    <psf:Feature name="ns0000:JobSecurePrint"> ———1101
        <psf:Option name="ns0000:SecurePrint" />
    </psf:Feature>
    <psf:ParameterInit name="ns0000:JobSecurePrintPassword"> ———1102
        <psf:Value xsi:type="xsd:string">XXXXXX</psf:Value>
    </psf:ParameterInit>
    ...
</psf:PrintTicket>
```

FIG. 13

```
*Feature: AdminInfoConfirmUserData
{
        *Name: "ConfirmUserData"
        *FeatureType: PRINTER_PROPERTY ———— 1201
        *ConflictPriority: 1900
        *ConcealFromUI?: TRUE
        *DefaultOption: Off
        *Option: Off ———— 1202
        {
                *Name: "Off"
        }
        *Option: On ———— 1203
        {
                *Name: "On"
        }
}
```

RECORDING MEDIUM, CONTROL METHOD AND INFORMATION PROCESSING APPARATUS HAVING PRINT SETTING THAT SELECTIVELY REQUIRES A PASSWORD

BACKGROUND OF THE INVENTION

Field of the Invention

The present invention relates to a recording medium that stores a program that provides a graphical user interface (GUI) for printing and an information processing apparatus.

Description of the Related Art

Regarding software for controlling image forming devices, a configuration of performing printing in an image forming device connected to a host computer using a printer driver installed in the host computer is known. An operating system (which will be referred to as an OS below) that is basic software is installed in the host computer, and the printer driver is configured according to specifications defined by the OS. The vendor providing the image forming device can obtain a means for giving printing instructions to the image forming device by providing a printer driver suitable for the specifications of the OS.

In a case in which an OS of a version previous to Microsoft Windows 8 is used as the OS of the host computer, the printer driver has the architecture called a V3 printer driver. A V3 printer driver can provide a function of displaying a user interface (UI) at the time at which a print request is made from a user and prompting the user to perform an operation. For example, when a print request is made, an event prescribed by a configuration module, which is a component of the V3 printer driver, may be invoked, and thus the configuration module can display the user interface while processing the event.

Meanwhile, a new architecture called a V4 printer driver has emerged since Windows 8. Because security is the most important factor in the architecture of a V4 printer driver, customizability of the printer driver itself has deteriorated. For example, the aforementioned configuration module is provided from the OS, and the vendor only can provide a setting file and a script file for customizing operations of the configuration module. In order to compensate for such deteriorated customizability, the vendor providing the image forming device can provide dedicated applications for assisting functions of the printer driver. Such applications are called Windows Store Device Apps (WSDAs).

In addition, since Windows 10, applications can be created on a new form of platform called a Universal Windows Platform (UWP). Applications for the platform are called UWP Device Apps. These UWP Device Apps can expand WSDAs and add an application called Workflow (WF) to the WSDAs.

In a WF function, a thread not having a UI which is called a background task is generated by an OS during printing. The background task can also invoke a foreground task (UI). In addition, the image forming device has a function of using an authentication function called secure printing (which is also called authenticated printing). When the function is used, the printer driver transmits a print job to which authentication information such as a password has been attached to the image forming device. The image forming device receives the print job to which the authentication information has been attached and can perform output after a user goes through authentication on the image forming device. If this function is used, output is not started when a print instruction is given, and there is no output until a user has been authenticated by the image forming device, and therefore, a user can safely receive a printed material without it being seen by anyone.

In printing using a V4 printer driver, while security and convenience are improved, control is performed by a framework provided by the OS as the main agent after a print request is made. Thus, in printing using a V4 printer driver in the past, it has not been possible to give a notification of a UI or the like to users after an instruction to execute printing is given. Thus, even if a secure print function in which a user is authenticated using a password is selected, if input of the password is omitted, it is not possible to display a pop-up UI prompting the user to input the password. As disclosed in JP 2015-166918, there also is a proposal for pop-up display at the time of conversion to print data. However, it is necessary for an XPS filter or a V4 printer driver that is in charge of the conversion to print data to perform expansion of adjusting control or the like by performing inter-process communication, which is complicated. In addition, there still is a functional limit to realizing pop-up through special expansion.

SUMMARY OF THE INVENTION

The present invention provides a program that can display a pop-up UI for every print job according to a situation in which input of a password is omitted. In addition, the present invention provides a program that can display a pop-up UI when a print instruction is given.

A recording medium of the present invention is a non-transitory recording medium storing a computer program for an application providing a Graphical User Interface (GUI) which causing a computer to perform each step of a control method of the computer, the method including: receiving a print ticket including a print setting according to activation of the program for the application by an operating system after a print instruction is given by a user, and displaying a screen for authenticated printing based on the received print ticket in which the authenticated printing has been set.

Further features of the present invention will become apparent from the following description of exemplary embodiments with reference to the attached drawings.

BRIEF DESCRIPTION OF THE DRAWINGS

FIG. 4A and FIG. 4B are diagrams illustrating description examples of metadata.

FIG. 11 is a diagram illustrating an example of a print capability.

FIG. 12 is a diagram illustrating an example of a print ticket.

FIG. 13 is a diagram illustrating a description example of definition items in a device function text file.

DESCRIPTION OF THE EMBODIMENTS

Exemplary embodiments for implementing the present invention will be described below using drawings and tables. The embodiments described below do not limit the invention according to the claims, and all combinations of characteristics described in the embodiments are not essential to the means for solving the invention.

First Embodiment

Figure 1:
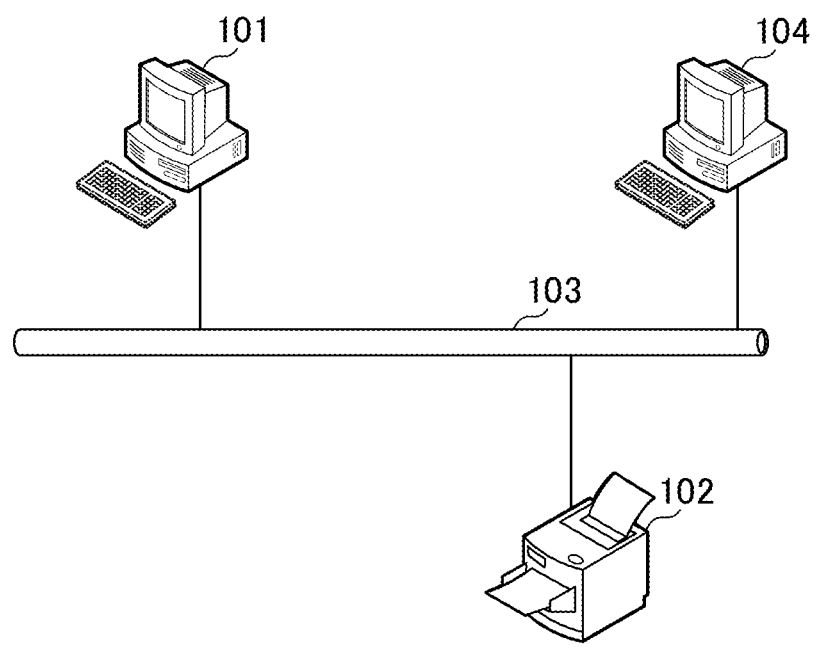
FIG. 1 is a diagram illustrating a system configuration.

First, a configuration of a system according to the present embodiment will be described using FIG. 1. FIG. 1 illustrates a schematic diagram illustrating an outline of a system configuration according to the present embodiment. The system according to the present embodiment has a client computer 101, a server 104, and a printer 102. The client computer 101 is an example of an information processing apparatus. The server 104 distributes data to the client computer 101. The printer 102 receives print data in a page description language (which will be referred to as a PDL) form and performs printing. Each of the devices can communicate with the others through a network 103 including a wide area network (WAN). In addition, the printer 102 may be a single function printer only having a printing function or may be a multi-function printer having a printing function, a scanning function, and a copy function. In addition, the number of client computers 101 connected to the network 103 is not limited to one and may be many.

Figure 2:
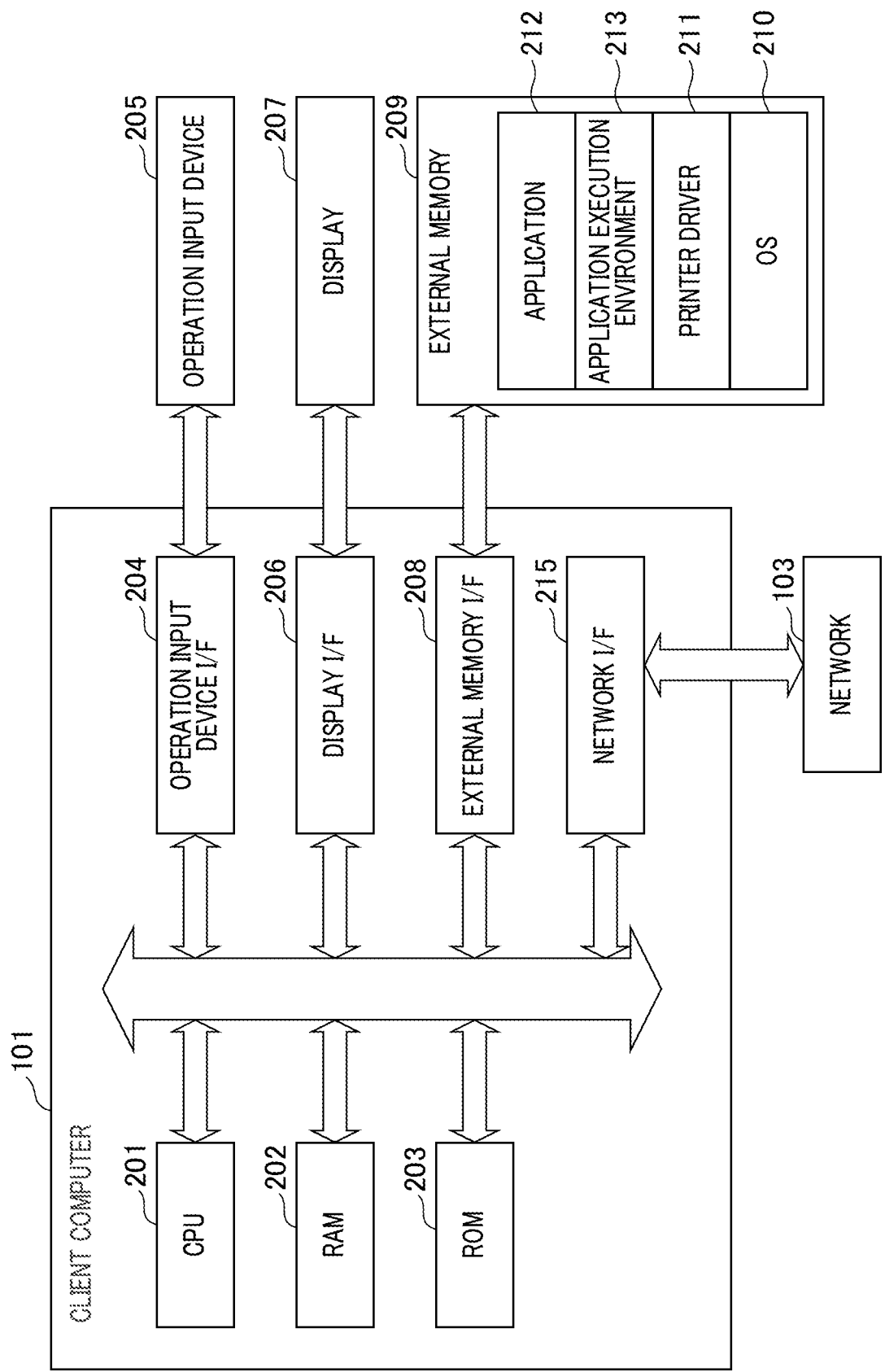
FIG. 2 is a diagram illustrating an example of a hardware configuration of a client computer.

FIG. 2 is a block diagram illustrating a hardware configuration of the client computer 101 of FIG. 1. In the client computer 101, a central processing unit (the CPU 201) controls each device connected to a system bus according to programs stored in a random access memory (RAM 202). In addition, the client computer 101 is assumed to have at least one CPU 201. In addition, when the CPU 201 executes a process based on a program stored in an external memory 209, processes of software configurations of the client computer 101 and each step of the flowcharts to be described below are realized. The RAM 202 functions as a main memory of the CPU 201, a work area, and the like. In a read only memory (ROM) 203, a boot program and various programs of basic input/output systems (BIOS) and the like are written.

An operation input device interface (I/F) 204 is an interface for controlling an operation input device 205 such as a keyboard, a pointing device (mouse), a touch user interface (UI), or the like. The operation input device 205 functions as an accepting unit that accepts an operation from a user. The display I/F 206 controls screen display for a display 207. The display 207 functions as a display unit that displays information to a user. An external memory I/F 208 controls access to an external memory 209, for example, a hard disk (HD), a solid state disk (SSD), or the like. The external memory 209 stores an application execution environment 213, various applications 212, and various files for each of a touch panel and a desktop in addition to an operating system program (OS) 210, and the like. In addition, the client computer 101 functions as a readable storage medium. A network I/F 215 is connected to the printer 102 via a network and performs a communication control process. In addition, the server 104 also has the same hardware configuration as that of the client computer 101 and thus operates similarly.

Figure 3:
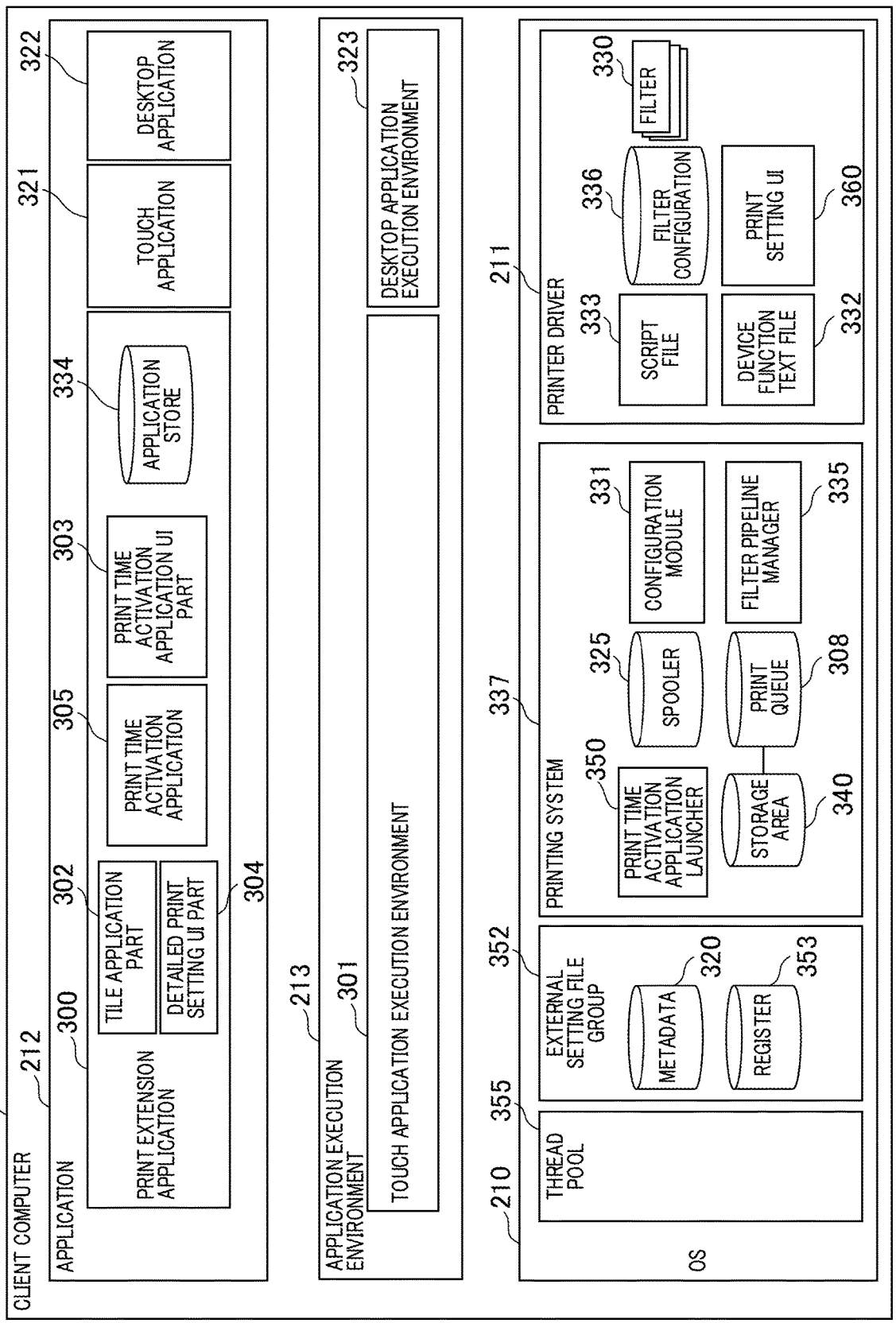
FIG. 3 is a diagram illustrating an example of a software configuration of a client computer.

Next, a software configuration of the client computer 101 will be described using FIG. 3. First, an operation software provided in the client computer 101 will be described. The software of the client computer 101 is constituted by three layers for the OS 210, the application execution environment 213, and the applications 212.

First, each of elements constituting the OS 210 will be described. The OS 210 is broadly constituted by a printing system 337, a printer driver 211, an external setting file group 352, and a thread pool 355. Next, elements constituting the external setting file group 352 of the OS 210 will be described. Metadata 320 of the external setting file group 352 is definition information having identifiers of both a print extension application 300 and a print queue and has a role of associating each of them. The metadata 320 will be described using FIG. 4A and FIG. 4B. A registry 353 is an area in which setting groups of the OS 210 are described. In the registry 353, a setting of whether a print time-activated application launcher 350, which will be described below, should activate a print time-activated application 305, which is a background task, can be registered. This background task is a function available in Universal Windows Platform Applications (UWP Apps). The background task is used to perform processes of maintaining the latest state or receiving update information even in a state in which the user is not operating an application. Meanwhile, when an application is operating in the background, battery power and computational resources are likely to be being consumed. For this reason, the OS 210 provides the user with a function of setting whether use of the background task should be permitted for each of the UWP Apps. The setting of whether use of the background task should be permitted for each application set using the function is registered in the registry 353.

Next, elements constituting the printing system 337 will be described. The print queue 308 is an area in which print jobs are temporarily stored when printing is performed using a printer on the network 103. In the present embodiment, it is assumed that the print queue 308 of the printer 102 has been created. When the print queue 308 is created, a storage area 340 associated with the print queue is generated based on a part of the function described in the device function text file 332. The storage area 340 stores individual settings and functions of each print queue. This can provide functions which are controllable for each print queue, rather than a print setting function to be switched for each job, by making a specific description with respect to the function definition part of the device function text file 332.

A spooler 325 is a module that temporarily holds and manages XML paper specification (XPS) files that are print subject data printed from the applications 212. An XPS file held in the spooler 325 is converted into a PDL by a filter pipeline manager 335, which will be described below, and transmitted to the printer 102 through the spooler 325.

The filter pipeline manager 335 constitutes a part of the OS 210, and a filter 330 is one of elements constituting the printer driver 211 which will be described below. The filter pipeline manager 335 reads one or more filters 330 based on the definition of the filter configuration 336 and converts the XPS file held in the spooler 325 into the PDL.

A configuration module 331 is a module having a prohibition function of correcting generation, alteration, and an invalid setting for a print ticket, and the like. By invoking an application programming interface (API) of the configuration module 331, a print ticket that is print setting information and a print capability that is device capability information can be acquired. The print ticket and the print capability are written in an eXtensible Markup Language (XML) format.

A detailed print setting UI part 304, a print time-activated application 305, and a print time-activated UI part 303 of the print extension application 300, which will be described below, invoke a selected API of the configuration module 331 of the printer driver 211. Accordingly, the print ticket and the print capability are acquired. The print time-activated application launcher 350 activates the print time-activated application 305 based on the settings stored in the registry 353 when printing is performed on the applications 212.

The printer driver 211 includes the filter 330, the filter configuration 336, a script file 333, a print setting UI 360, and the device function text file 332. The filter 330 is a module that is invoked by the filter pipeline manager 335 and has a role of converting an XPS file into a PDL. The filter configuration 336 is a definition file referred to by the filter pipeline manager 335 in which the order of invoking the filter 330 is described. The device function text file 332 in which the script file 333 and functions of the device are described customizes operations of the configuration module 331. The print setting UI 360 is a UI that provides a setting change function operated in a desktop application execution environment 323, which will be described below, and edits a print ticket that is a print setting associated with the print queue 308. In addition, the print setting UI 360 can also have an editing function of a storage area 340 associated with the print queue 308. The thread pool 355 is a module that accumulates threads to be used when the various applications 212 and module groups included in the OS 210 are executed.

Next, the individual elements constituting the application execution environment 213 will be described. The application execution environment 213 is constituted by the desktop application execution environment 323 and a touch application execution environment 301. The touch application execution environment 301 has an API group for executing a touch application 321, which is one type of the applications 212 to be described below, and the print extension application 300, and also performs memory management and the like when these applications are executed. Meanwhile, the desktop application execution environment 323 has an API group for executing a desktop application 322, which is one type of the applications 212 to be described below, and performs memory management and the like when it is executed.

Next, the individual elements constituting the applications 212 will be described. The applications 212 are constituted by the three types of application including the touch application 321, the print extension application 300, and the desktop application 322. The touch application 321, which is one type of the applications 212, operates on the touch application execution environment 301. The touch application 321 is selected by a user himself or herself through an application distribution system published on the Internet and installed in the client computer 101. The print extension application 300, which is one type of the touch application 321, operates on the touch application execution environment 301, as does the touch application 321. The print extension application 300 is acquired by the OS 210 from the application distribution system through the Internet and installed in the client computer 101. The print extension application 300 is constituted by a tile application part 302, the detailed print setting UI part 304, the print time-activated application 305, and the print time-activated UI part 303.

The tile application part 302 displays a UI in a tile form (e.g., a graphical user interface (GUI), etc.) when it is triggered by a user operation of activating the print extension application 300. The detailed print setting UI part 304 displays a UI for detailed print setting when it receives a detailed print setting event issued by the OS 210. The detailed print setting UI part 304 generates a UI for detailed print setting based on the print ticket and the print capability acquired through the API from the configuration module 331. The detailed print setting UI part 304 changes the value of the print ticket in accordance with an input of the user and then returns the print ticket to the configuration module 331. The print time-activated application 305 and the print time-activated UI part 303 provide a function called workflow (WF) to execute processes relating to printing when it is triggered by a predetermined user operation or the like. The print time-activated application 305 is a component for executing the background task activated by the print time-activated application launcher 350 when the print event is issued. The print time-activated application 305 acquires the print ticket from the API of the configuration module 331 and writes a content of the print ticket. The print time-activated application 305 determines whether to activate the print time-activated UI part 303 which is a component for executing a foreground task from the settings and parameters of the print ticket and requests the OS 210 to activate the print time-activated UI part 303.

When it is determined not to activate the print time-activated UI part 303, the print time-activated application 305 does not activate the print time-activated UI part 303 and proceeds to a printing process which will be described below. In addition, the print time-activated application 305 exchanges the setting and parameter of the print ticket with the print time-activated UI part 303 through an application store 334. The print time-activated UI part 303 acquires the print ticket and the print capability and changes the settings. In the present embodiment, the print time-activated UI part 303 displays a UI for checking details of printing, a UI for helping the user to input settings that have not been input, and the like. Here, the printer 102 that is a device and the print extension application 300 are associated with the metadata 320.

FIG. 4A and FIG. 4B are examples of descriptions of the metadata 320. FIG. 4A is an example of descriptions showing a device information list associated with the print extension application 300. In the metadata 320, a HardwareIDList tag 402 indicating a list of printers 102 is described. In addition, a hardware ID is identification information for uniquely identifying a printer to be returned from the printer. An item 403 indicates a printer 102 having a hardware ID of MFP1_abcd, and similarly, an item 404 indicates a printer 102 having a hardware ID of MFP2_ijkl. As described above, a plurality of printers 102 associated with the print extension application 300 can be listed on one piece of metadata 320. Although the case in which hardware IDs of two printers are designated in the metadata 320 is exemplified in the present embodiment, the invention is not limited thereto. One or three or more hardware IDs are possible.

A DeviceCompanionApplicatioins tag 411 indicating the print extension application 300 is described in the metadata 320 of FIG. 4B. In an item 412, the ID of the print extension application 300 and the ID of the vendor are described. In the present embodiment, the value "1234abcd.MFPUtility" represents the print extension application 300. In addition, the value "12345678-abcd-efgh-ijkl-123456789012" represents the printer vendor providing the print extension application 300.

As described above, the printer 102 which is a device and the print extension application 300 are associated based on the metadata of FIGS. 4A and 4B. When the printer 102 is connected to the client computer 101, the OS 210 searches the metadata 320 registered in a predetermined server (a server for metadata managed by Microsoft). Then, when the metadata 320 in which a Hardware ID returned by the connected printer 102 is described is found on HardwareIDList, the client computer 101 stores the Hardware ID in the installed external memory 209. Furthermore, the OS 210 acquires the print extension application 300 described in the DeviceCompanionApplication tag 411 of the stored metadata 320 from an application distribution system, which is not illustrated. Then, the print extension application 300 is installed in the external memory 209 and associated with the printer 102.

Accordingly, when a print request is generated with respect to the printer 102 via the printer driver 211, the print extension application 300 can be activated. The metadata 320 is provided by the printer vendor. The printer vendor provides the metadata 320 to the server for metadata managed by Microsoft in advance. Accordingly, when the printer driver 211 is installed in a user environment, it is possible to perform control such that the optimum print extension application 300 for devices connected to the user environment is automatically installed.

Figure 5:
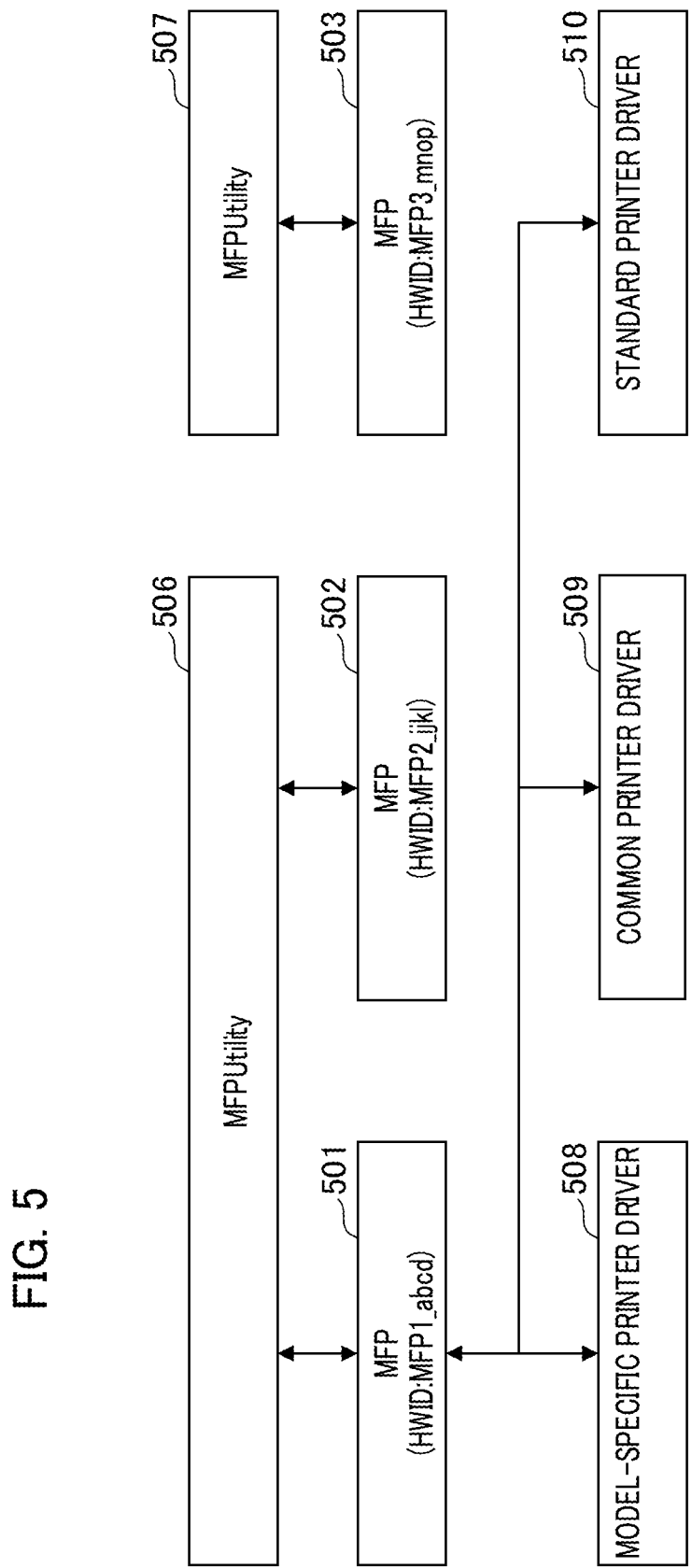
FIG. 5 is a block diagram illustrating an example of a print environment constructed in a print system.

FIG. 5 is a diagram illustrating an example of a print environment constructed in the metadata 320. An MFP 501 which is the printer 102 has a Hardware ID "MFP1_abcd." When the MFP 501 is connected to the client computer 101, the OS 210 acquires the metadata 320 in which the Hardware ID "MFP1_abcd" is described on the HardwareIDList tag. Furthermore, the OS 210 acquires the print extension application 300 called MFPUtility 506 described in the metadata 320 and associates it with the MFP 501.

In addition, there can be a plurality of types of printer driver installed in the client computer 101 for the MFP 501. That is, there can be a plurality of printer drivers as printer drivers supporting the MFP 501 which is one device. For example, a model-specific printer driver 508 is a printer driver dedicated to the MFP 501. In addition, a common printer driver 509 is a printer driver that enables printers 102 of a plurality of types to perform printing. In addition, the model-specific printer driver 508 and the common printer driver 509 are drivers unique to each vendor. In addition, a standard printer driver 510 is a driver that enables printers 102 provided by a plurality of vendors to perform printing by using a standardized print method. The standard printer driver 510 is provided as one function included in the package of the OS 210 along with the OS 210.

As described above, there are a plurality of available printer drivers for the printer 102, and usable printer drivers vary depending on an Internet connection state, the type of OS 210, a user environment, and the like. Normally, the OS 210 automatically selects the most functional and latest printer driver among available printer drivers with reference to the version information or the like of the printer drivers and installs it. In addition, the printer driver includes information for specifying a device called Hardware ID and Compatible ID. When a printer is connected to the client computer 101, the OS 210 acquires information of the IDs from the printer, searches for the printer driver having the IDs, and installs it.

As described above, by providing the metadata 320, the printer vendor providing the printer can perform control of which print extension application 300 is to be provided to each printer. For example, the printer vendor can provide one print extension application 300 that is common for a plurality of printers and also can provide different print extension applications 300. However, it is not possible to provide print extension applications 300 varying according to the type of printer driver 211 associated with one printer. In FIG. 5, although there are three types of printer drivers 211 used by the MFP 501, which are the driver 508 to the driver 510, the print extension application 300 that can be linked to each of the drivers is one type at all times.

In addition, there is a case in which a plurality of printers 102 and a plurality of types of printer 102 are used differently in a user print environment. It is necessary to manage each of the model, the initial value of a print setting, and a print job corresponding to the printer driver 211 for each printer 102 serving as an output destination. To do this, the OS 210 generates the print queue 308 as an object corresponding to the printer 102 serving as an output destination at the time of installation. The OS 210 manages a configuration module and the initial value of the print setting of the printer driver 211 in association with the print queue 308.

Here, the printer 102 having a secure print function (an authenticated printing function) and how the print extension application 300 ascertains the functions of the printer 102 will be described. The printer 102 has the secure print function of gaining the input of the code number set by the client computer 101 at the time of printing. The function of the printer 102 is described in the device function text file 332 of the printer driver 211. The print extension application 300 ascertains that the printer 102 has the secure print function by receiving the print capability generated by the configuration module 331 based on the device function text file 332. In addition, the print extension application 300 ascertains that the secure print function has been set in the current print setting by reading the print ticket generated by the configuration module 331.

FIG. 11 is an example of a print capability generated by the configuration module 331 based on the device function text file 332. The print capability illustrated in FIG. 11 shows a capability list of the printer driver 211 in an XML format. The print capability has a plurality of options among one feature element. Feature represents a function, and an Option group included in the function represents an option. The print capability 1001 shows a description example of Feature and Option of a secure print in an XML. Description of JobSecurePrint in Feature indicates that the secure print function is possible. In addition, as options of Feature of JobSecurePrint, two options of "ns0000: SecurePrint," that is, "ON" by which the function becomes effective and "ns0000: None," that is, "OFF" by which the function becomes void are shown.

Next, FIG. 12 is an example of a print ticket generated by the configuration module 331 based on an input of a user. The print ticket stores any of set values of respective functions in the XML format defined in the print capability as a current print setting. For example, the element of Feature that is called ns0000: JobSecurePrint indicated by an item 1101 indicates the function of secure printing in which authentication through input of the password is performed to identify the identification. Since Option included in Feature of JobSecurePrint is set to ns0000: SecurePrint, it indicates that the secure print function is set to ON. In addition, in a case in which ns0000: None is set in the same option, it means that the secure print function is set to OFF. In addition, in a case in which nothing is set in the same Option, the print time-activated UI part 303 of the present embodiment determines that it is equal to the case in which ns0000: None is set in Option. In psf: ParameterInit indicated by an item 1102, a value "XXXXXX" input as the password for the authentication of the identification is retained. The present drawing shows a case in which secure printing has been set to be ON at the time of printing, the password has been input, and the value of the password has been retained in the print ticket. In a case in which the password is not input even though secure printing has been set to ON at the time of printing, the place for the value of the password remains blank.

Figure 6:
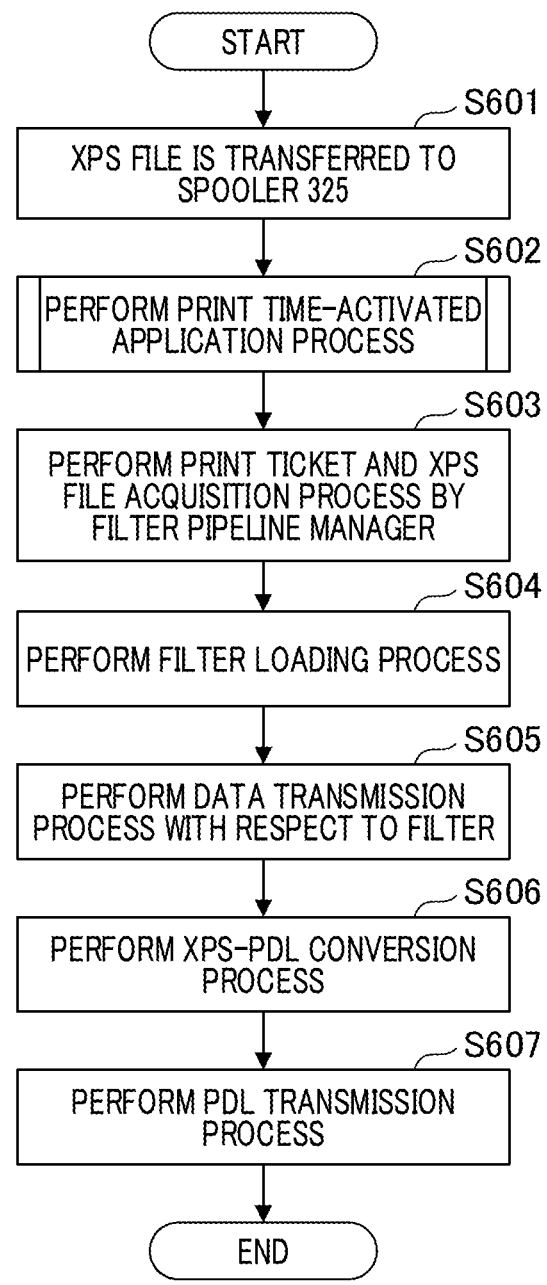
FIG. 6 is a flowchart illustrating an example of a printing process according to a first embodiment.
Figure 10A:
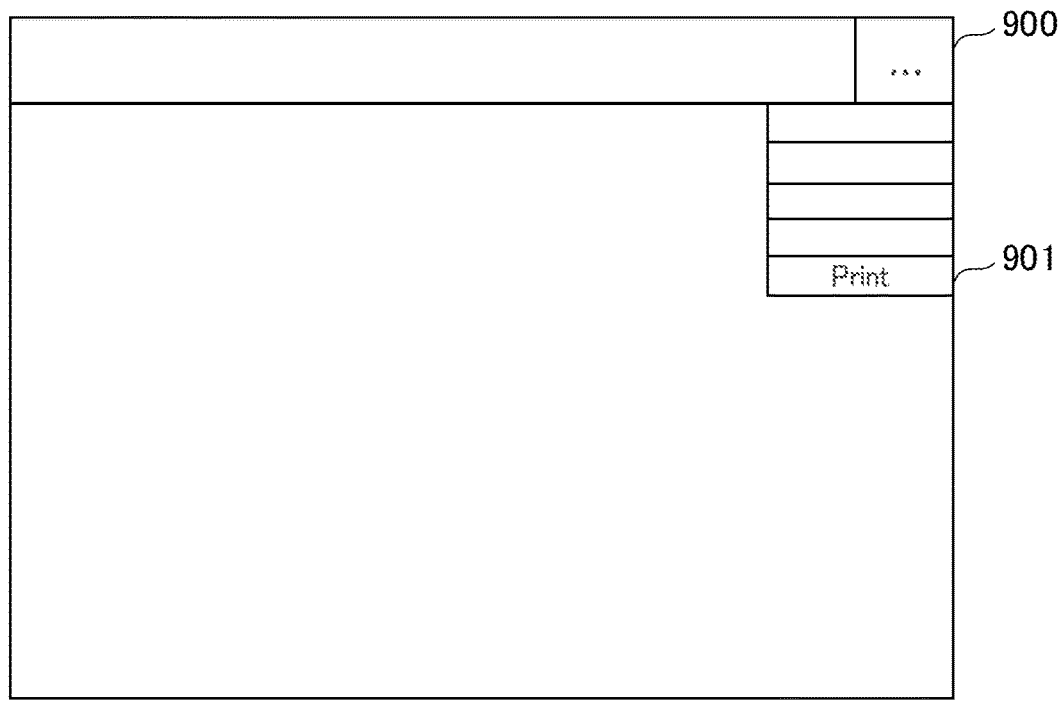
FIGS. 10A and 10B are schematic diagrams of a touch application and a print dialog.
Figure 10B:
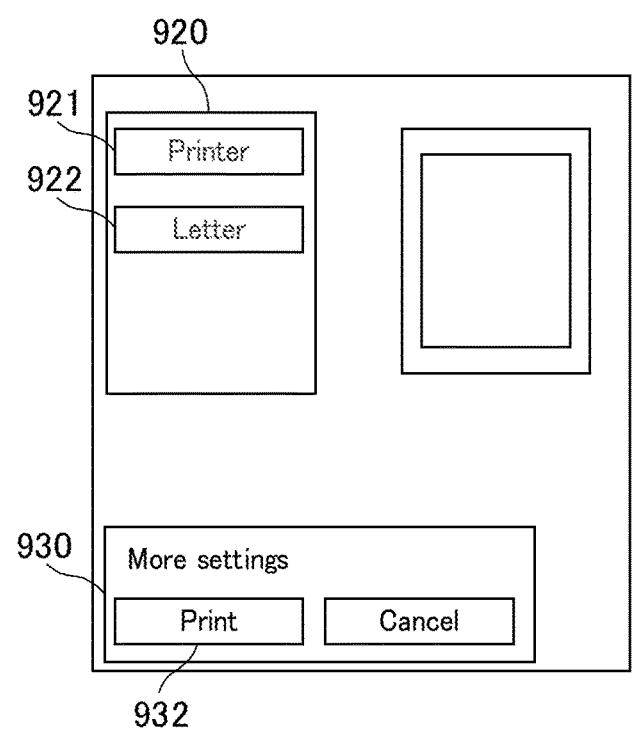

Next, a basic flow operated until printing is performed by the touch application 321 will be described using FIG. 6. Each operation (step) shown in the flowchart of FIG. 6 is realized by when the CPU 201 reads and executes a program for realizing each module, component, and application stored in the external memory 209 in the RAM 202. In a case in which control provided by each control module, component, and application is described, each unit realized by the CPU 201 will be described as the subject. In addition, some processes such as display, acceptance of a user operation, data transmission/reception processes, and the like are assumed to be realized in cooperation of the CPU 201, each of I/Fs, and input and output devices connected to the I/Fs. In addition, although the present embodiment will be described using the touch application 321 (FIG. 10A), it is a matter of course that printing is also possible in the desktop application 322. FIG. 10A is a schematic diagram in which the touch application 321 has been activated. The touch application 321 enumerates the list of options of a menu when a menu content button 900 is tapped. Next, when a print item 901 which is an option of the menu is selected through a user operation, the touch application 321 makes a request for display of a print dialog with respect to the OS 210 and displays the print dialog. FIG. 10B is a print dialog in which a simple print setting generated by the OS 210 is performed. The print dialog has a print setting part 920 and a print event generation part 930. A list of simple print settings is displayed in the print setting part 920. 921 denotes the name of a selected printer queue 308, and 922 denotes an example of a set print setting. The print dialog causes a print event to be generated by accepting a user operation after the display and pressing a print button 932 of the print event generation part 930.

After the generation of the print event, the touch application 321 generates an XPS file of print subject data and starts the basic flow at the time of printing described in FIG. 6. In the present embodiment, a mechanism of displaying a checking UI or a UI for re-inputting a setting after a start of print is provided using a workflow. A specific control method will be described using the basic flow at the time of printing illustrated in FIG. 6. In addition, each of applications and modules is stored in the external memory 209, loaded in the RAM 202 if necessary, and executed by the CPU 201 on the client computer 101. The flow shown in FIG. 6 begins from when a print event is generated from the application 212. The application 212 that causes the print event may be the touch application 321 or the desktop application 322.

First, the OS 210 transfers an XPS file generated by the application 212 that has caused the print event to the spooler 325 in Step S601. Next, a process of the print time-activated application 305 is executed in Step S602. This process will be described below since it occupies an important role. Next, the filter pipeline manager 335 acquires a print ticket and an XPS file from the spooler or the print time-activated application 305 according to the result of the process of Step S602 in Step S603. Next, the filter pipeline manager 335 reads the filter 330 from the external memory 209 based on the definition of the filter configuration 336 and develops it in the RAM 202 in Step S604. Next, the filter pipeline manager 335 transfers the XPS file to the filter 330 in Step S605. The filter 330 converts the XPS file to a PDL and transfers the PDL to the spooler 325 in Step S606. Then, the spooler 325 transmits the PDL to the printer 102 in Step S607.

Figure 14:
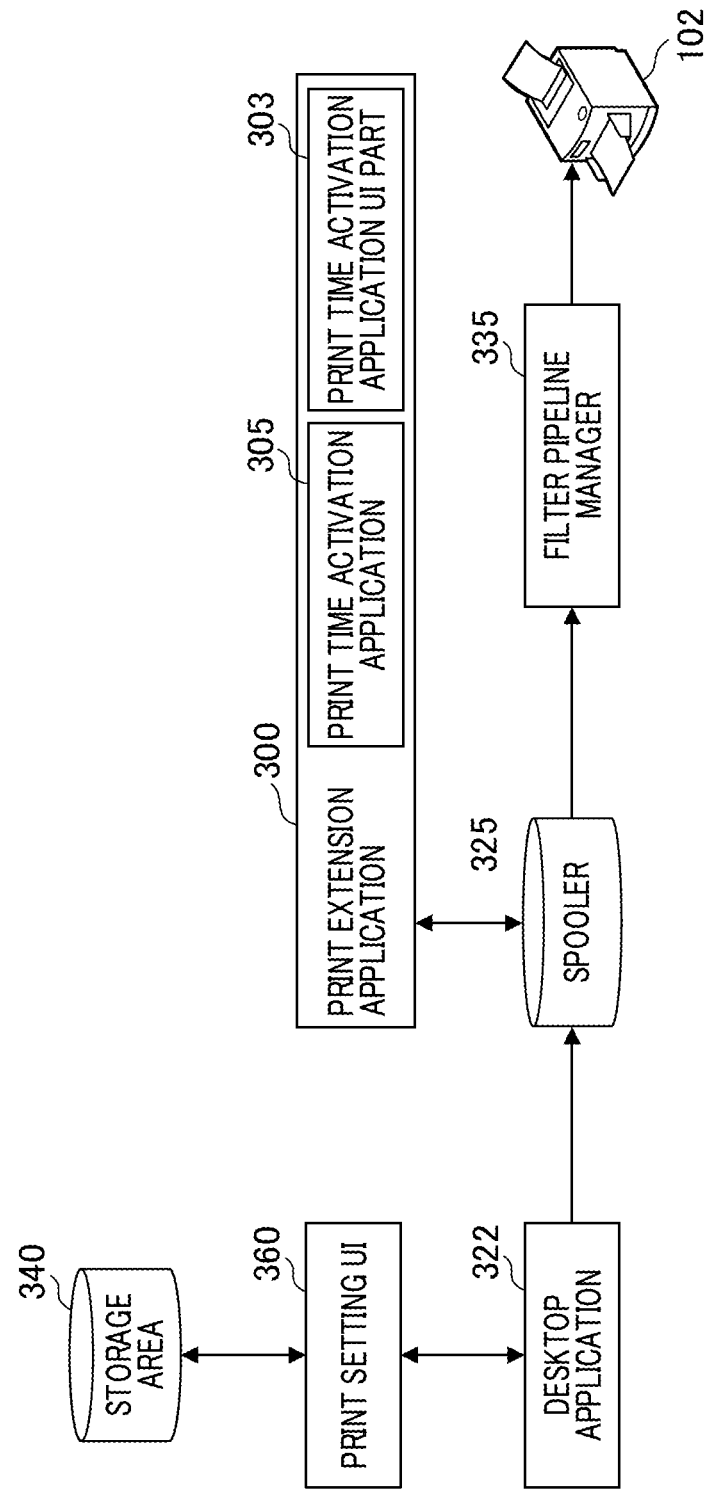
FIG. 14 is a schematic diagram describing a data flow at the time of printing.

Next, a basic print flow will be described using FIG. 14. In the description of the flow, printing from the desktop application 322 will be described. To start printing from the desktop application 322 having the printing function, a user selects the print queue 308 associated with the printer 102 serving as the output destination. At this time, by opening the print setting UI 360 of the printer driver 211 relating to the target print queue 308, a variety of function changes can be made. For example, a change can be made to have a setting such as the "double-sided setting" that is a setting to perform printing on both sides of one sheet of paper, or "black and white printing" for having a monochrome print result. Here, in an enterprise environment in which a plurality of image forming devices are mixed, there is a demand to vary display of a pop-up UI in each of the image forming devices. Thus, the present embodiment makes it possible to control pop-up display in for each print queue associated with the image forming device. Specifically, a setting indicating whether pop-up display is to be performed is stored in the storage area 340 associated with a print queue.

Figure 15:
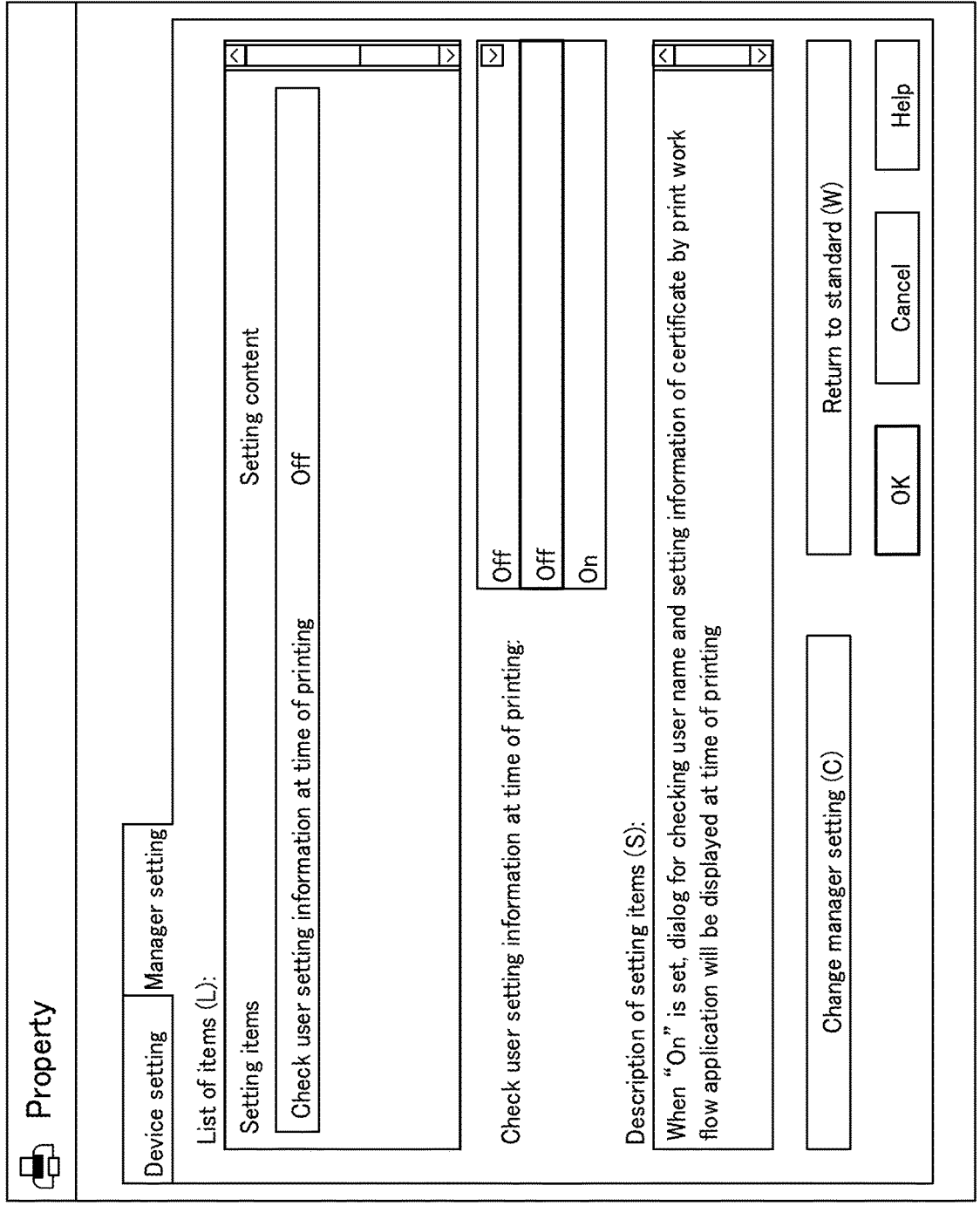
FIG. 15 is a diagram illustrating an example of a UI screen for selecting whether pop-up display is to be performed.

Next, a method of changing a corresponding setting will be described. A user can change a corresponding setting on a property screen displayed by the print setting UI 360 of a printer driver. FIG. 15 shows an example of a property screen, illustrating a case in which the setting item "checking user setting information at the time of printing" is selected and a list of set values is displayed. As set values, "ON" and "OFF" are prepared. A user can change the setting by selecting a set value from the list. The print setting UI 360 that has detected an operation made by the user to change the setting makes a specific description with respect to the function definition part of the device function text file 332 based on the setting information. The printing system 337 changes the setting of the storage area 340 associated with the print queue corresponding to the printer driver based on the specific description.

The specific description will be described using FIG. 13. By describing the *FeatureType: PRINTER_PROPERTYattribute (1201) for a Feature attribute, the setting of each print queue is expressed. In a case in which "ON" is set on the property screen, an object 1203 indicating "ON" is described, and the description of an object 1202 is deleted. In addition, in a case in which "OFF" is set on the property screen, the object 1202 indicating "OFF" is described. The printing system 337 updates the setting of the storage area 340 with reference to the description.

Figure 20:
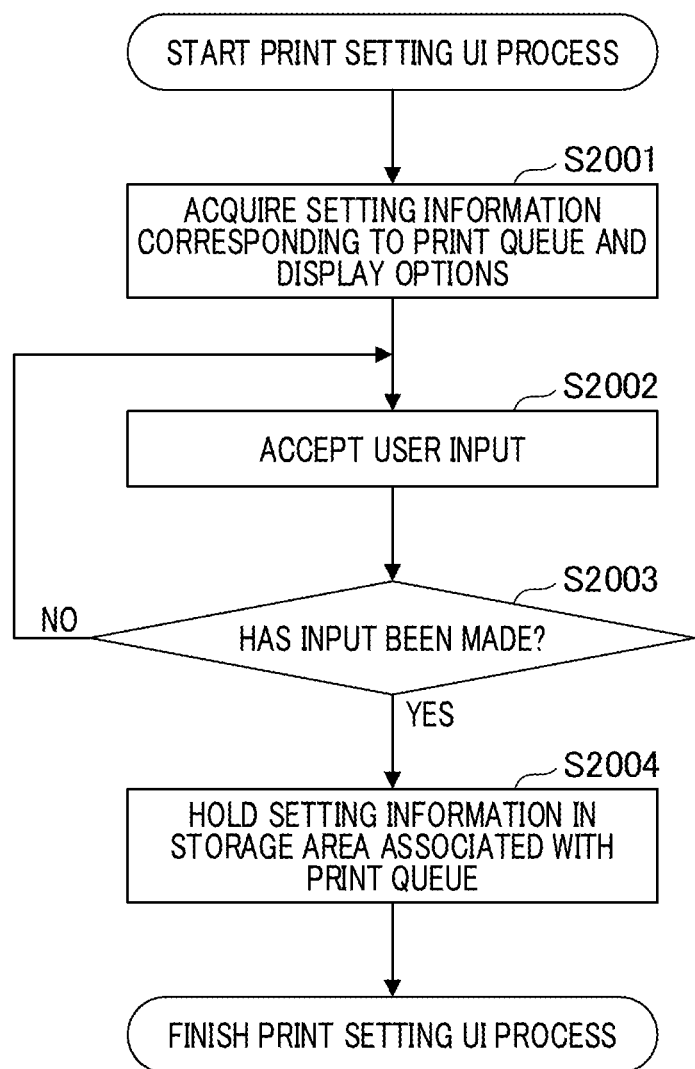
FIG. 20 is a flowchart showing a print setting process according to the first embodiment.

Next, a specific control method of the change process will be described using the flowchart of FIG. 20. Each operation (step) shown in the flowchart of FIG. 20 is realized when the CPU 201 reads and executes a program for realizing each module, component, and application stored in the external memory 209 in the RAM 202. In a case in which control provided by each control module, component, and application is described, each unit realized by the CPU 201 will be described as the subject. In addition, some processes such as display, reception of a user operation, data transmission/reception processes, and the like are assumed to be realized in cooperation of the CPU 201, each of I/Fs, and input and output devices connected to the I/Fs.

First, the print setting UI 360 acquires setting information stored corresponding to a print queue and displays a screen including options exemplified in FIG. 15 in Step S2001. Next, the print setting UI 360 transitions to a state to accept a user operation and accepts a user input in Step S2002. The input includes a setting change of whether the secure print function is to be used. In Step S2003, the print setting UI 360 determines whether input has been made through a user operation, and returns to Step S2002 if no input has been made. On the other hand, if input has been made, the print setting UI 360 proceeds to Step S2004. Next, in Step S2004, the print setting UI 360 stores the setting information input in Step S2002 in the storage area 340 associated with the print queue in cooperation with the OS, and then the series of processes end. In addition, the setting of whether the secure print function stored in the print queue is to be used will be referred to in the flowcharts which will be described below.

Figure 7:
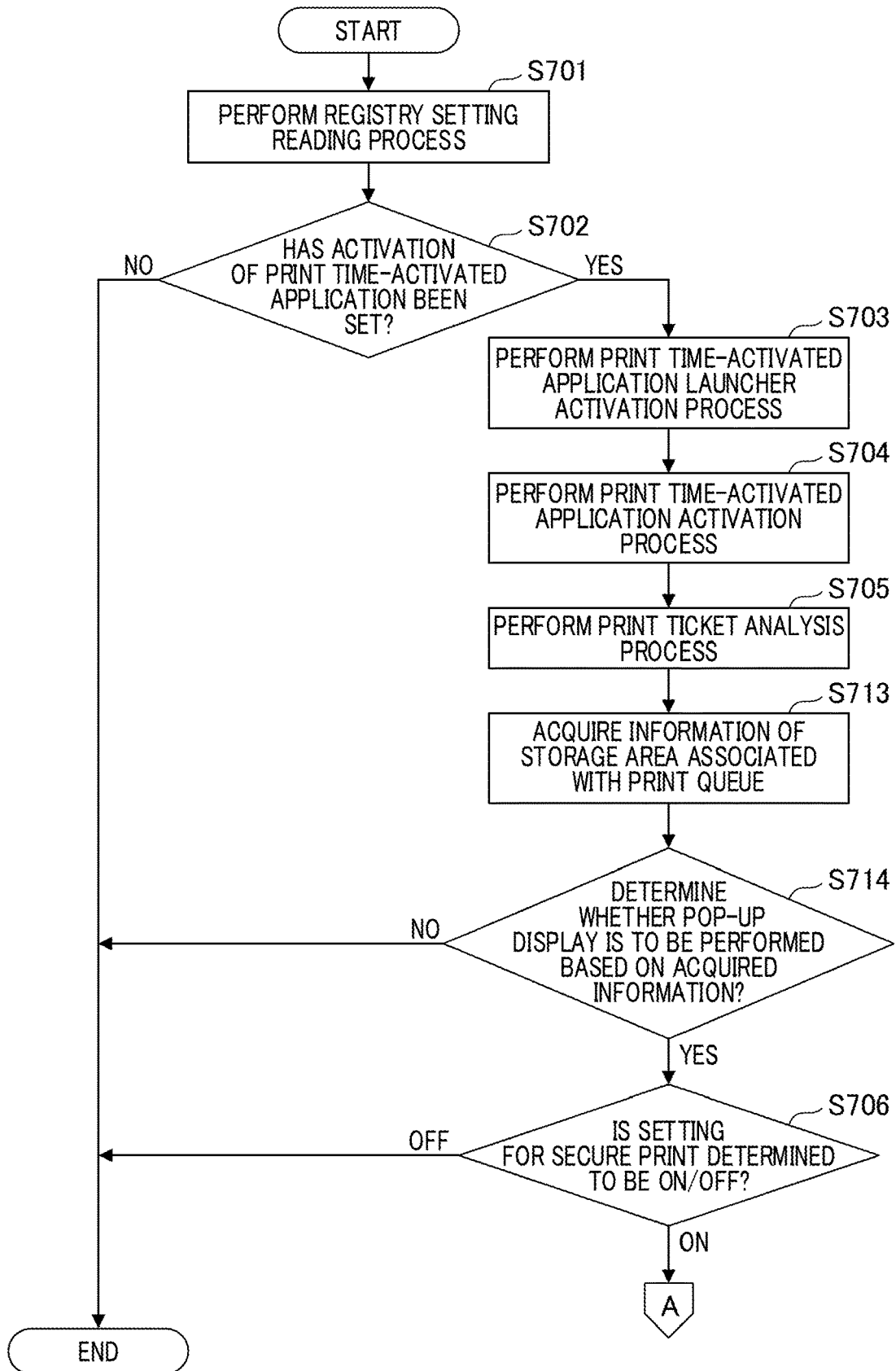
FIG. 7 is a flowchart illustrating an example of a printing time-activated process according to the first embodiment.
Figure 8:
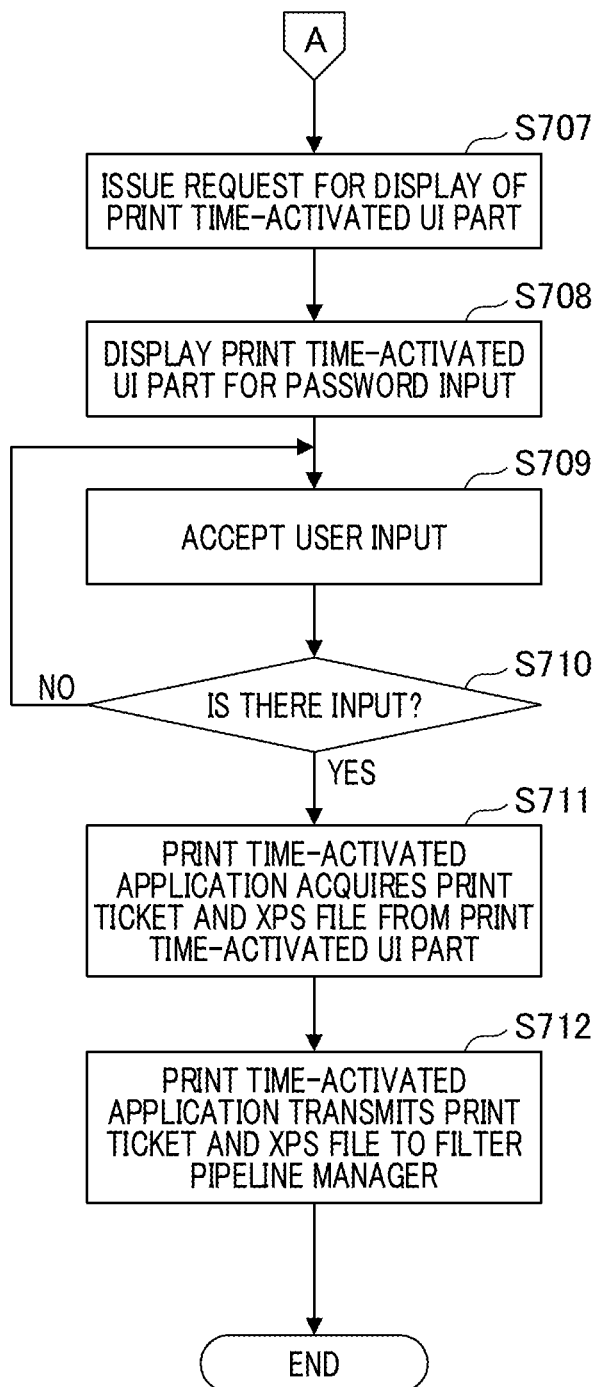
FIG. 8 is a flowchart illustrating an example of a printing time-activated process according to the first embodiment.

Next, a printing time-activated process will be described using FIG. 7 to FIG. 9C. Each operation (step) shown in the flowcharts of FIG. 7 and FIG. 8 is realized when the CPU 201 reads and executes a program for realizing each module, component, and application stored in the external memory 209 in the RAM 202. In a case in which control provided by each control module, component, and application is described, each unit realized by the CPU 201 will be described as the subject. In addition, some processes such as display, acceptance of a user operation, data transmission/reception processes, and the like are assumed to be realized in cooperation of the CPU 201, each of I/Fs, and input and output devices connected to the I/Fs. First, the OS 210 reads the setting of the registry 353 in Step S701. Next, if activating the print time-activated application 305 has not been set in the registry 353 in Step S702, the OS 210 skips a series of UI activation processes and causes the process to proceed to data conversion and transmission processes performed from Step S603. On the other hand, if activating the print time-activated application 305 has been set in the registry 353, the OS 201 causes the process to proceed to Step S703. In addition, even if not using a background task has been set in the registry 353, the series of UI activation process is assumed to be skipped.

Next, the OS 210 activates the print time-activated application launcher 350 in Step S703. Then in Step S704, the print time-activated application launcher 350 makes a request with respect to the OS 210 to activate the print time-activated application 305 as a background task. Then, the print time-activated application 305 is activated when the touch application execution environment 301 develops the print extension application 300 in the RAM 202. Then in Step S705, the print time-activated application 305 acquires the print ticket from the configuration module 331, analyzes the content of the print ticket, and extracts the description of the function setting and parameter from the analysis result.

Next, the print time-activated application 305 acquires information of the storage area 340 associated with the print queue 308 corresponding to the image forming device to be used in printing in Step S713. In the present embodiment, the information to set whether pop-up display is to be performed is acquired and the process proceeds to Step S714. In Step S714, the print time-activated application 305 determines whether pop-up display is to be performed using the setting information acquired in Step S713. If pop-up display is not performed, that is, "OFF" is set based on the determination result, the OS 210 skips the series of UI activation process and causes the process to proceed to the data conversion and transmission processes performed from Step S603. If pop-up display is performed, that is, "ON" is set, the process proceeds to Step S706.

Then, the print time-activated application 305 determines whether the function extracted from the print ticket includes a setting for the secure print function and "ON" is set in Step S706. If secure printing is not set in Step S706, the OS 210 skips the series of UI activation processes and causes the process to proceed the data conversion and transmission processes performed from Step S603. If secure printing is set and "ON" is set in Step S706, the print time-activated application 305 issues a request for display of the print time-activated UI part 303 to the OS 210 in Step S707. The OS 210 that has accepted the request allocates a UI thread for password input from the thread pool 355 included in the OS 210 to the print extension application 300 in Step S708 and generates the print time-activated UI part 303 of the print extension application 300.

Figure 9A:
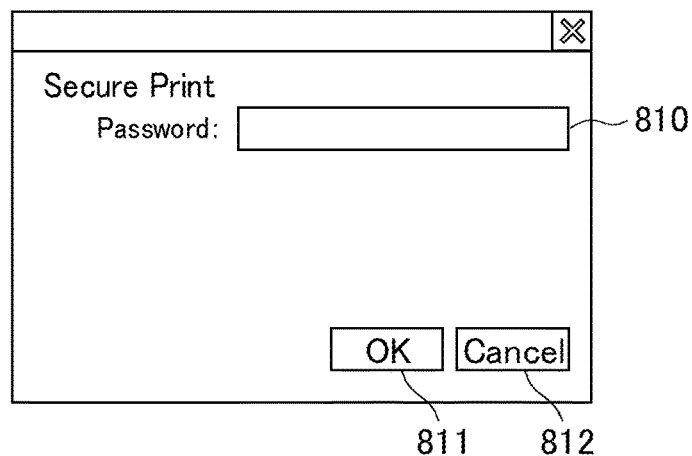
FIG. 9A to 9C are diagrams illustrating examples of screens of a print dialog and a print time-activated UI part for warning.

Then, the print time-activated UI part 303 is displayed on the display 207. In the present embodiment, the password input screen illustrated in FIG. 9A is displayed in Step S708. The print time-activated UI part 303 then accepts a user operation in Step S709. The text box 810 of FIG. 9A is a password input text box and accepts input of a password from a user. A button 811 is an OK button for confirming the password input into the password input text box 810 and reflecting it into the print ticket when an operation event such as clicking is accepted. The OK button 811 may not accept the confirmation of the password by displaying it to be grayed out or a message in a case in which the input of the password input text box 810 is invalid or disabled. A button 812 is a cancellation button for cancelling printing by accepting an operation such as clicking.

Returning to the description of FIG. 8, when the input is accepted through the user operation, the print time-activated UI part 303 closes Windows and the process proceeds to Step S711. Then, the print time-activated application 305 acquires the print ticket and the XPS file from the print time-activated UI part 303 in Step S711. Next, the print time-activated application 305 transmits the acquired print ticket and XPS file to the filter pipeline manager 335 in Step S712.

As described above, according to the present embodiment, the print time-activated application 305 analyzes the print ticket and determines the display of the print time-activated UI part based on enabled/disabled states of the setting for the secure print function. Thus, in a case in which the setting for the secure print function is enabled, it is possible to display a screen for forcedly prompting the user to perform input. In addition, according to the present embodiment, whether to perform pop-up display for each of print queues associated with image forming devices can be switched. Thus, a screen according to the intention of the user or the manager can be displayed.

Second Embodiment

In the first embodiment, the mechanism in which the screen for forcedly prompting the user to perform input is displayed by determining the display of the print time-activated UI part based on the enabled/disabled states of the setting for the secure print function has been described. In the present embodiment, a mechanism in which the presence or absence of a parameter which is a password is also used to determine display of the print time-activated UI part will be described.

Figure 16:
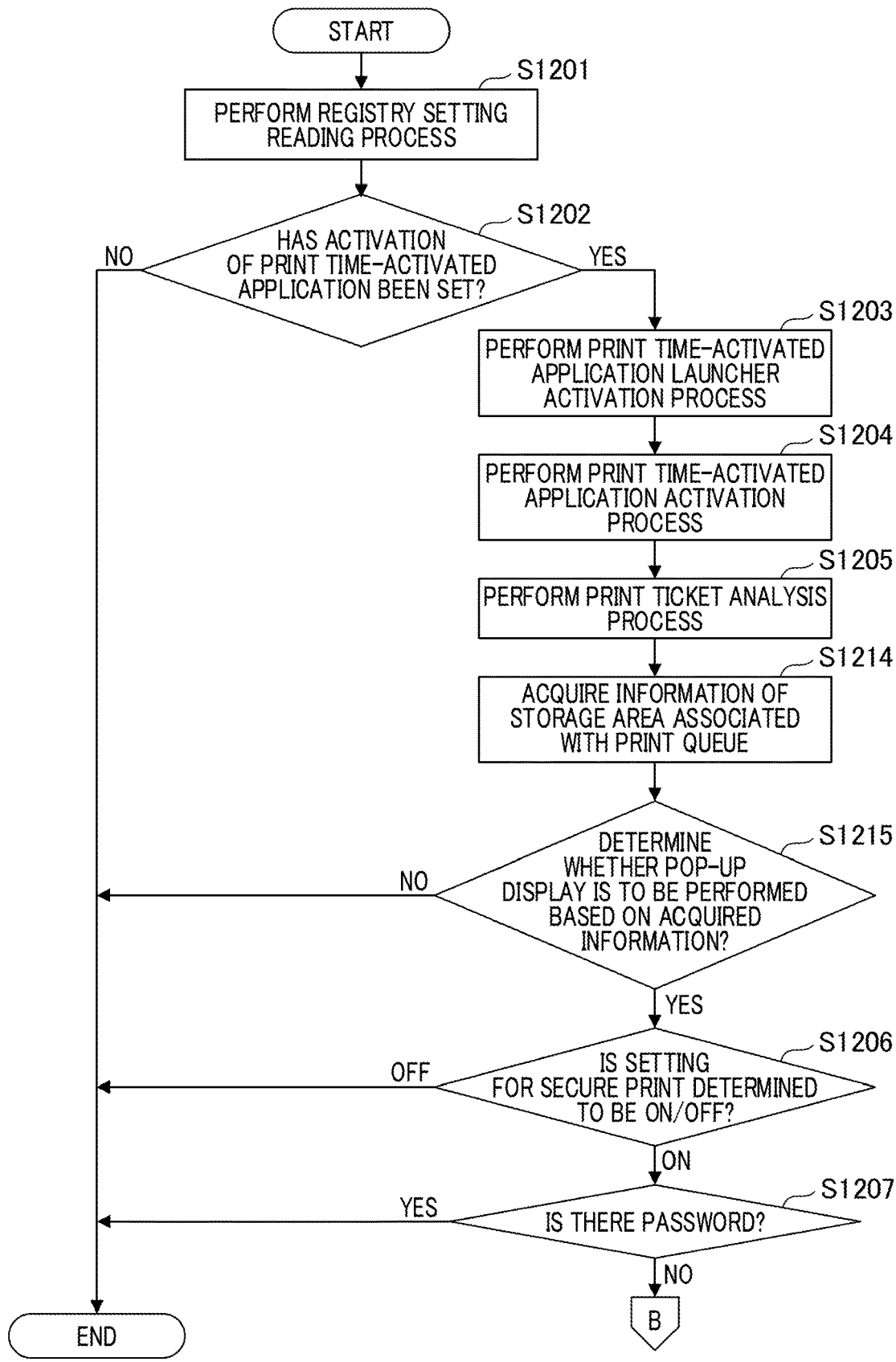
FIG. 16 is a flowchart showing an example of a printing time-activated process according to a second embodiment.

A specific process according to the present embodiment will be described using FIG. 16 and FIG. 17. In addition, each of applications and modules is stored in the external memory 209, loaded in the RAM 202 if necessary, and executed by the CPU 201 on the client computer 101. In addition, detailed description of reference numerals that have already been described above will not be repeated. Since the processes up to the activation process of the print time-activated application 305 shown in Step S1201 to Step S1204 are similar to those of Step S701 to Step S704 of FIG. 7 of the first embodiment, detailed description thereof will be omitted. In addition, the print time-activated application 305 acquires the print ticket from the configuration module 331, analyzes the content of the print ticket, and extracts the description of the function setting and parameter in Step S1205.

Next, the print time-activated application 305 acquires information of the storage area 340 associated with the print queue 308 in Step S1214. In the present embodiment, setting information of whether pop-up display is to be performed is acquired, and the process proceeds to Step S1215. In Step S1215, the print time-activated application 305 determines whether pop-up display is to be performed using the setting information acquired in Step S1214. If pop-up display is not to be performed, that is, "OFF" is set, the OS 210 skips the series of UI activation processes and causes the process to proceed to the data conversion and transmission processes performed from Step S603. If pop-up is to be performed, that is, "ON" is set, the process proceeds to Step S1206.

Then, in Step S1206, the print time-activated application 305 determines whether the function extracted from the print ticket includes the setting for the secure print function and "ON" is set. If secure printing is not set in Step S1206, the OS 210 skips the series of UI activation processes and causes the process to proceed to the data conversion and transmission processes performed from Step S603. On the other hand, if secure printing is set and "ON" is set in Step S1206, the presence or absence of the password in the print ticket is determined in Step S1207.

Then, if the print time-activated application 305 determines that there is no password in the print ticket in Step S1207, the print time-activated application 305 issues a request for display of the print time-activated UI part 303 to the OS 210 in Step S1208. The OS 210 that has accepted the request allocates a UI thread for password input from the thread pool 355 included in the OS 210 to the print extension application 300 and generates the print time-activated UI part 303 of the print extension application 300 in Step S1209. Then, the print time-activated UI part 303 is displayed on the display 207. In the present embodiment, the password input screen illustrated in FIG. 9A is displayed in Step S1209. Next, the print time-activated UI part 303 accepts a user operation in Step S1210.

Here, the text box 810 of FIG. 9A is a password input text box and accepts input of a password from a user. The OK button 811 is an OK button for confirming the password input into the password input text box 810 and reflecting it into the print ticket when an operation event such as clicking is accepted. The OK button 811 may not accept the confirmation of the password by displaying it to be grayed out or a message in a case in which the input of the password input text box 810 is invalid or disabled. The button 812 is a cancellation button for cancelling printing by accepting an operation such as clicking.

Figure 17:
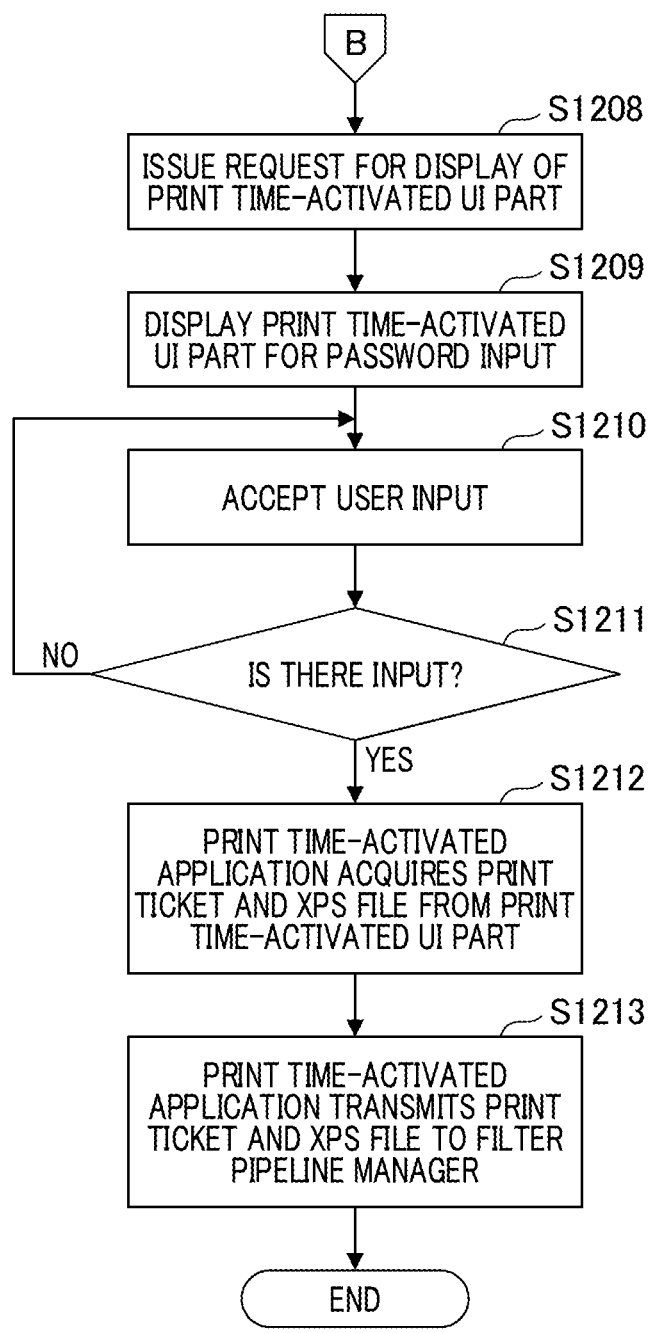
FIG. 17 is a flowchart showing an example of the printing time-activated process according to the second embodiment.

Returning to the description of FIG. 17, when the input is accepted through the user operation, the print time-activated UI part 303 closes Windows and the process proceeds to Step S1212. Then, the print time-activated application 305 acquires the print ticket and the XPS file from the print time-activated UI part 303 in Step S1212. Next, the print time-activated application 305 transmits the acquired print ticket and XPS file to the filter pipeline manager 335 in Step S1213.

As described above, according to the present embodiment, the print time-activated application 305 analyzes the print ticket and determines display of the print time-activated UI part based on the presence/absence of the parameter which is the password, rather than enabled/disabled states of the setting for the secure print function. Thus, only in a case in which the input of the password for the secure print function is omitted, the screen can be displayed to the user.

Third Embodiment

Figure 18:
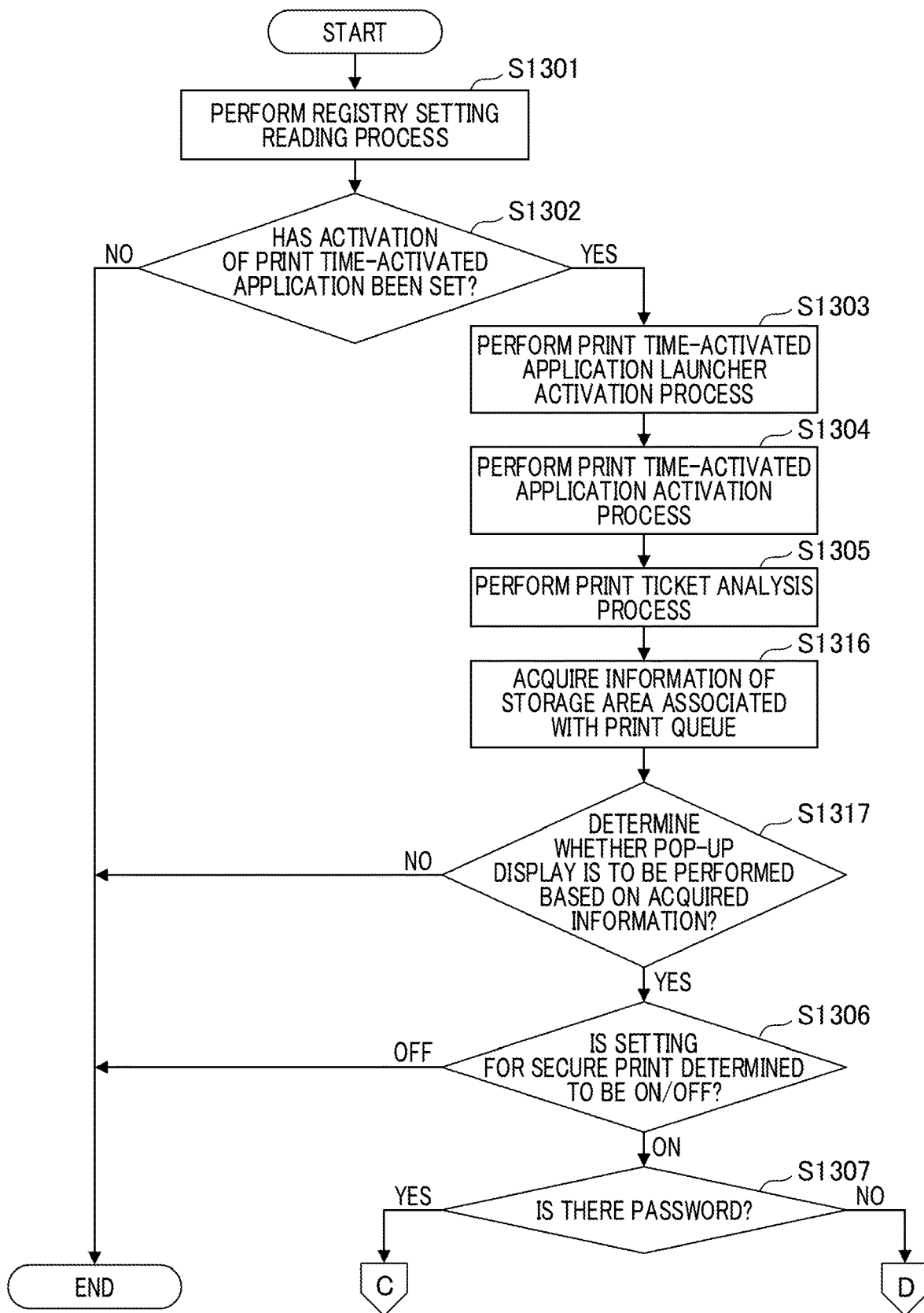
FIG. 18 is a flowchart showing an example of a printing time-activated process according to a third embodiment.

The mechanism in which the presence or absence of the parameter which is a password is used in determination of display of the print time-activated UI part has been described in the second embodiment. In the present embodiment, a mechanism in which the presence or absence of the parameter which is a password is used to dynamically change the type of screen for display of the print time-activated UI part will be described. A specific process according to the present embodiment will be described using FIG. 18 and FIG. 19. In addition, each of applications and modules is stored in the external memory 209, loaded in the RAM 202 if necessary, and executed by the CPU 201 on the client computer 101. In addition, detailed description of reference numerals that have already been described above will not be repeated. Since the processes up to the activation process of the print time-activated application 305 shown in Step S1301 to Step S1304 are similar to those of Step S701 to Step S704 of FIG. 7 of the first embodiment, detailed description thereof will be omitted. In addition, the print time-activated application 305 acquires the print ticket from the configuration module 331, analyzes the content of the print ticket, and extracts the description of the function setting and parameter in Step S1305.

Next, the print time-activated application 305 acquires information of the storage area 340 associated with the print queue 308 in Step S1316. In the present embodiment, setting information of whether pop-up display is to be performed is acquired, and the process proceeds to Step S1317. In Step S1317, the print time-activated application 305 determines whether pop-up display is to be performed using the setting information acquired in Step S1316. If pop-up display is not to be performed, that is, "OFF" is set, the OS 210 skips the series of UI activation processes and causes the process to proceed to the data conversion and transmission processes performed from Step S603. If pop-up is to be performed, that is, "ON" is set, the process proceeds to Step S1306.

Then, in Step S1306, the print time-activated application 305 determines whether the function extracted from the print ticket includes the setting for the secure print function and "ON" is set. If secure printing is not set in Step S1306, the OS 210 skips the series of UI activation processes and causes the process to proceed to the data conversion and transmission processes performed from Step S603. On the other hand, if secure printing is set and "ON" is set in Step S1306, the presence or absence of the password in the print ticket is determined in Step S1307.

Figure 9B:
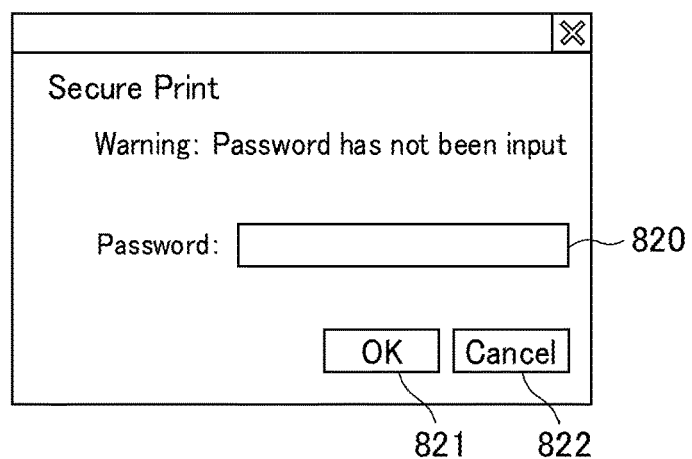

Then, if the print time-activated application 305 determines that there is no password in the print ticket in Step S1307, the print time-activated application 305 issues a request for display of the print time-activated UI part 303 for warning to the OS 210 in Step S1308. The OS 210 that has accepted the request allocates a UI thread for password input from the thread pool 355 included in the OS 210 to the print extension application 300 and generates the print time-activated UI part 303 of the print extension application 300 on a warning screen in Step S1309. Then, the print time-activated UI part 303 generated on the warning screen is displayed on the display 207. In the present embodiment, the screen illustrated in FIG. 9B is displayed in Step S1309.

On the other hand, if the print time-activated application 305 determines that there is a password in the print ticket in Step S1307, the print time-activated application 305 issues a request for display of the print time-activated UI part 303 for checking to the OS 210 in Step S1314. The OS 210 that has accepted the request allocates the UI thread for password input from the thread pool 355 included in the OS 210 to the print extension application 300 and generates the print time-activated UI part 303 of the print extension application 300 on a checking screen in Step S1315. Then, the print time-activated UI part 303 generated on the checking screen is displayed on the display 207.

Figure 9C:
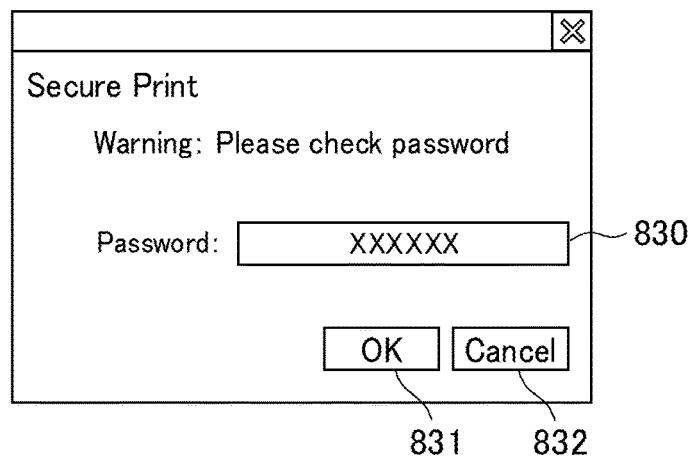

In the present embodiment, the screen illustrated in FIG. 9C is displayed in Step S1315. Since the process performed after the print time-activated UI part 303 for warning or checking is displayed is the same, it will be described using FIG. 9B. In Step S1310, the print time-activated UI part 303 accepts a user operation. The text box 820 of FIG. 9B is a password input text box that accepts input of the password from the user. An OK button 821 is an OK button for confirming the password input into the password input text box 820 and reflecting it into the print ticket when an operation event such as clicking is accepted. The OK button 821 may not accept the confirmation of the password by displaying it to be grayed out or a message in a case in which the input of the password input text box 820 is invalid or disabled. A cancel button 822 is a cancellation button for cancelling printing by accepting an operation such as clicking.

Figure 19:
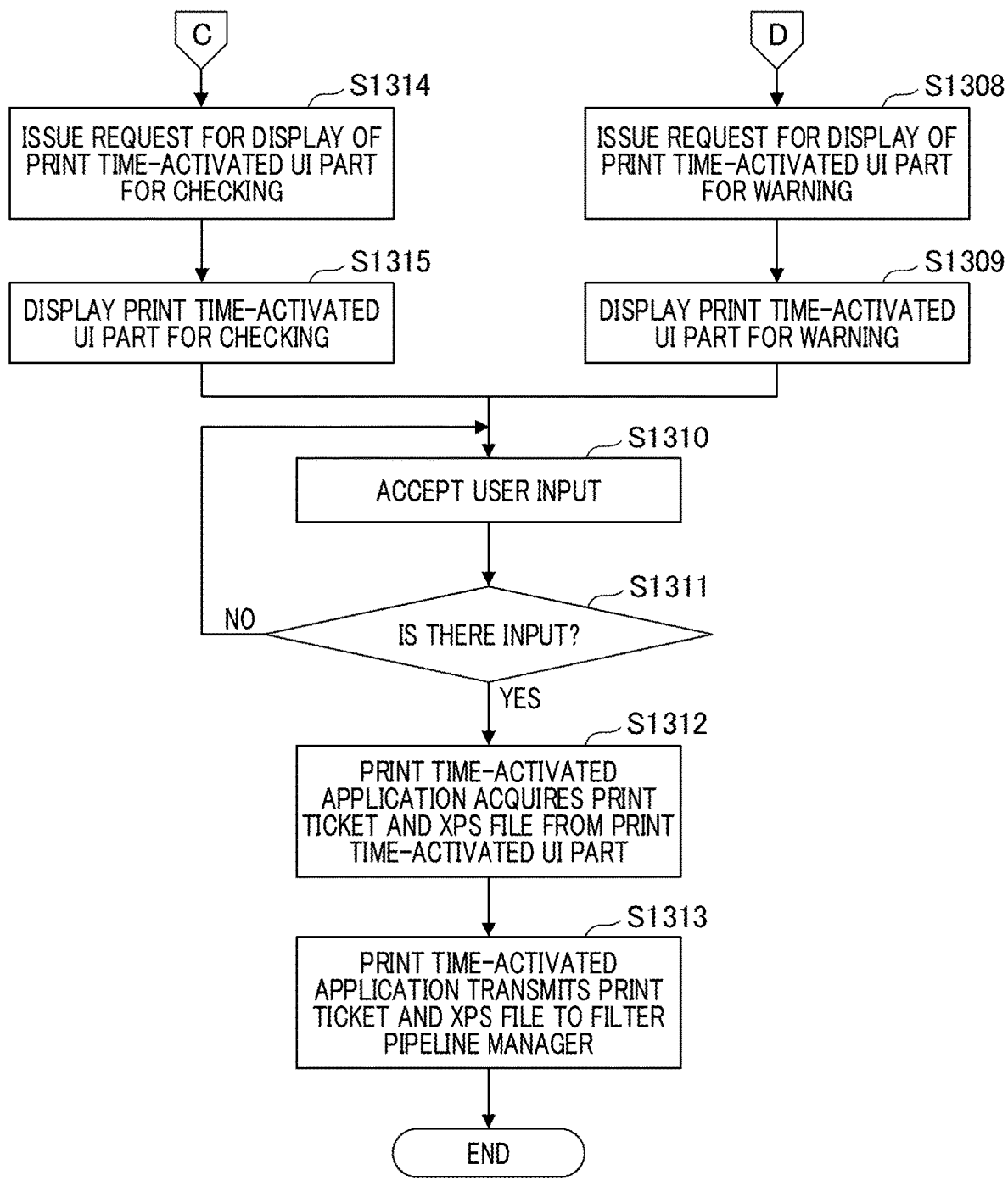
FIG. 19 is a flowchart showing an example of the printing time-activated process according to the third embodiment.

Returning to the description of FIG. 19, when input is accepted through a user operation, the print time-activated UI part 303 closes Windows and the process proceeds to Step S1312. Then, the print time-activated application 305 acquires the print ticket and the XPS file from the print time-activated UI part 303 in Step S1312. Next, the print time-activated application 305 transmits the acquired print ticket and XPS file to the filter pipeline manager 335 in Step S1313.

As described above, according to the present embodiment, the print time-activated application 305 analyzes the print ticket, determines display of the print time-activated UI part based on the presence or absence of the parameter that is the password, and dynamically changes the type of screen to be displayed. Thus, it is possible to inform the user of what kind of situation is occurring.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a continuation of and claims the benefit of U.S. patent application Ser. No. 17/571,869, filed Jan. 10, 2022, which is a continuation of and claims the benefit of U.S. patent application Ser. No. 16/382,445, filed Apr. 12, 2019, now U.S. Pat. No. 11,275,542, issued on Mar. 15, 2022, which in turn claims the benefit of Japanese Patent Application No. 2018-089181, filed May 7, 2018, all of which are hereby incorporated by reference herein in their entirety.

What is claimed is:

1. A non-transitory recording medium storing an application program that, when executed by a controller of an information processing apparatus, performs a method comprising:
cooperating with a standard driver, the standard driver generating print data which is printable by printers respectively provided by a plurality of printer vendors and causing the information processing apparatus to transmit the generated print data, the standard driver being different from printer drivers respectively provided by the plurality of printer vendors; and causing the information processing apparatus to display a reception part for receiving authentication information, input of the authentication information on a printer being required for printing of the print data which is generated by the standard driver.

2. The non-transitory recording medium according to claim 1, wherein the reception part is caused not to be displayed on the information processing apparatus in a case where a secure printing function for performing the printing based on the input of the authentication information is not set to be enabled, and the reception part is caused to be displayed on the information processing apparatus in a case where the secure printing function is set to be enabled.

3. The non-transitory recording medium according to claim 2, wherein an option for setting the secure printing function to be enabled and an option for setting the secure printing function to be disabled are stored in a print capability of the printer, which is the print capability described in an XML format.

4. The non-transitory recording medium according to claim 1, wherein the authentication information received by the reception part is stored in a print ticket described in an XML format.

5. The non-transitory recording medium according to claim 1, wherein the application program is an application program corresponding to a Hardware ID acquired from a printer by the operating system.

6. The non-transitory recording medium according to claim 1, wherein the standard driver generates the print data in a PDL format from XPS data.

7. The non-transitory recording medium according to claim 1, wherein a message related to the authentication information is caused to be displayed on the information processing apparatus.

8. The non-transitory recording medium according to claim 1, wherein the application program is activated based on an event related to a detailed print setting.

9. The non-transitory recording medium according to claim 1, wherein the authentication information is a password.

10. A control method for controlling an information processing apparatus, the control method comprising:
cooperating with a standard driver, the standard driver generating print data which is printable by printers respectively provided by a plurality of printer vendors and causing the information processing apparatus to transmit the generated print data, the standard driver being different from printer drivers respectively provided by the plurality of printer vendors; and
causing the information processing apparatus to display a reception part for receiving authentication information, input of the authentication information on a printer being required for printing of the print data which is generated by the standard driver.

11. An information processing apparatus, comprising:
a memory that stores an application program cooperating with a standard driver, the standard driver generating print data which is printable by printers respectively provided by a plurality of printer vendors and causing the information processing apparatus to transmit the generated print data, the standard driver being different from printer drivers respectively provided by the plurality of printer vendors; and
a controller that causes, by executing the application program, the information processing apparatus to display a reception part for receiving authentication information, input of the authentication information on a printer being required for printing of the print data which is generated by the standard driver.

12. A non-transitory recording medium storing an application program that, when executed by a controller of an information processing apparatus, performs a method comprising:
cooperating with a standard driver, the standard driver generating print data which is printable by printers respectively provided by a plurality of printer vendors and causing the information processing apparatus to transmit the generated print data; and
causing the information processing apparatus to display a reception part for receiving authentication information, input of the authentication information on a printer being required for printing of the print data which is generated by the standard driver,
wherein the application program is an application program corresponding to an ID obtained from the printer.

13. The non-transitory recording medium according to claim 12, wherein the reception part is caused not to be displayed on the information processing apparatus in a case where a secure printing function for performing the printing based on the input of the authentication information is not set to be enabled, and the reception part is caused to be displayed on the information processing apparatus in a case where the secure printing function is set to be enabled.

14. The non-transitory recording medium according to claim 13, wherein an option for setting the secure printing function to be enabled and an option for setting the secure printing function to be disabled are stored in a print capability of the printer, which is the print capability described in an XML format.

15. The non-transitory recording medium according to claim 12, wherein the authentication information received by the reception part is stored in a print ticket described in an XML format.

16. The non-transitory recording medium according to claim 12, wherein the application program is an application program corresponding to the ID acquired from the printer by an operating system.

17. The non-transitory recording medium according to claim 12, wherein the standard driver generates the print data in a PDL format from XPS data.

18. The non-transitory recording medium according to claim 12, wherein a message related to the authentication information is caused to be displayed on the information processing apparatus.

19. The non-transitory recording medium according to claim 12, wherein the application program is activated based on an event related to a detailed print setting.

20. The non-transitory recording medium according to claim 12, wherein the authentication information is a password.

21. The non-transitory recording medium according to claim 12, wherein the ID is a hardware ID.

* * * * *